United States Patent [19]

Obringer et al.

[11] Patent Number: 4,853,256
[45] Date of Patent: Aug. 1, 1989

[54] TWO PLY THERMAL PAPER AND METHOD OF MAKING

[75] Inventors: Thomas J. Obringer, Vandalia; Louis F. Siegel; Maurice W. Lewis, both of Dayton, all of Ohio

[73] Assignee: NCR Corporation, Dayton, Ohio

[21] Appl. No.: 170,567

[22] Filed: Mar. 11, 1988

Related U.S. Application Data

[62] Division of Ser. No. 896,495, Aug. 14, 1986, abandoned.

[51] Int. Cl.⁴ .............................................. B41M 5/18
[52] U.S. Cl. .................................... 427/152; 503/200; 503/225; 503/226
[58] Field of Search ................ 427/152; 503/204, 214, 503/226, 200, 221, 225

[56] References Cited

U.S. PATENT DOCUMENTS

| | | | |
|---|---|---|---|
| 3,539,375 | 11/1970 | Baum | 117/36.2 |
| 3,561,991 | 2/1971 | Baum | 117/36.1 |
| 3,674,535 | 7/1972 | Blose et al. | 117/36.8 |
| 4,400,437 | 8/1983 | Oeda | 428/913 |
| 4,523,207 | 6/1985 | Lewis et al. | 346/214 |
| 4,641,159 | 2/1987 | Seitz et al. | 503/200 |

FOREIGN PATENT DOCUMENTS 0054318 11/1982 Japan ................................... 346/204

OTHER PUBLICATIONS

Fallek Chemical Co.-Saturated Fatty Alcohols.
Nippon Steel Chemical Co. LTD.-Data Sheet.
Specification Sheet for Behenyl Alcohol, Fallek Chemical Company, Aug. 19, 1982.
Data Sheet for p-Benzyl Biphenyl, Nagase America Corporation, Aug. 19, 1985.

Primary Examiner—Bruce H. Hess
Attorney, Agent, or Firm—Wilbert Hawk, Jr.; Albert L. Sessler, Jr.; George J. Muckenthaler

[57] ABSTRACT

A two-ply laminated record medium has a thermally reactive coating applied to the base sheet and the top sheet is applied to the base sheet by using a wet lamination process. The coating provides sufficient adhesion to prevent separation of the top sheet and the base sheet during printing, while allowing for ease of separation of the two sheets after printing.

6 Claims, 1 Drawing Sheet

TWO PLY THERMAL PAPER AND METHOD OF MAKING

This is a divisional of co-pending application Ser. No. 896,495, filed on Aug. 14, 1986, now abandoned.

BACKGROUND OF THE INVENTION

In the field of thermal printing, it is well-known that a significant limitation in the printing operation is the absence of copies during such printing operation. The early thermal printing systems used a thermal print element energized to heat specific and precise areas of a heat-sensitive paper or like record material and thereby produce readable characters on the single sheet of paper. In this respect, the single sheet of paper includes material which is reactive to the applied heat and is described as a self-contained system.

More recently, thermal printing systems have included two separate sheets of paper or like record material, wherein each sheet is coated with a heat-sensitive reactive material. The top or front sheet is usually a light weight tissue-type paper which is coated with a heat-sensitive material and the second sheet is preferably bond-type paper which is also coated with a sensitive material. The two sheets are then mated or collated in a manner wherein the uncoated side of the tissue paper is in contact with the coating on the bond paper. The coated side of the tissue paper is adjacent and in close proximity to the thermal printing elements, or in certain applications, the elements may be in actual contact with the tissue paper. The thermal elements are actuated to provide specific and precise marking or imaging on the papers in the process which enables the obtaining of a master sheet plus a readable copy.

Alternatively, the tissue paper could be coated on both the front and back sides so that the thermal printing elements are adjacent or in contact with the front coated side of the tissue paper and the back coating is in contact with the bond paper. In similar manner, the thermal elements are actuated to provide the specific and precise marking or imaging on the two papers so as to be in readable form. The tissue sheet and the bond sheet are arranged in manifold manner and the imaging is accomplished by transfer of the ink or like material in the coating onto the sheet.

Representative documentation in the field of thermal printing includes U.S. Pat. No. 3,539,375, issued to H. H. Baum on Nov. 10, 1970, which discloses temperature-responsive record material that includes a support sheet having crystal violet lactone and a phenolic disposed in a matrix of polyvinyl alcohol, and arranged such that application of heat will produce a mark-forming reaction between the lactone and the phenolic.

U.S. Pat. No. 3,561,991, issued to H. H. Baum on Feb. 9, 1971, discloses a transfer record sheet for making multiple copies of a single heat impression wherein the translucent support sheet is coated with an ink source that normally is solid at room temperature and meltable to a tacky transfer condition upon application of heat. The melted coating stays in the tacky condition for a period of time to allow the making of a succession of copies upon contact of sheets with the melted image area.

U.S. Pat. No. 3,674,535, issued to J. H. Blose et al. on July 4, 1972, discloses heat-sensitive record material comprising a paper base sheet and a coating of chromogenic material and a bisphenol distribution in a polyvinyl alcohol in combination with a filler, a lubricant and a non-tacky wax.

U.S. Pat. No. 4,523,207, issued to M. W. Lewis et al. on June 11, 1985, discloses a multiple copy thermal record sheet that includes a coating formulation on one sheet having a synthetic polyterpene binder in a mixture of thermochromic dye and phenolic resin.

SUMMARY OF THE INVENTION

The present invention relates to thermal printing and to an improved system for making an original and at least one good record copy during the printing operation. More particularly, the invention is directed to the use of an improved coating provided on one record sheet such as paper or the like, and the coated sheet is then mated or collated with an uncoated sheet in a manner wherein the coating material is sandwiched between the sheets. In more specific language, the top or front record sheet is a tissue or translucent type paper and such sheet is laminated with a bottom or back record sheet by means of a wet coating material, which material is in contact with and layered on the front side of the rear record sheet, and which is preferably a bond or like paper. The coating material is sandwiched between the uncoated tissue and the front surface of the bond sheet and provides the adhering means for the two sheets. A coating is then applied to the front surface of the top or front sheet as a part of the single continuous laminating operation.

The two sheets are imaged by use of thermal printing elements being placed in extremely close proximity or in actual contact with the front side of the tissue sheet and heat emitted from such printing elements is transferred through the tissue sheet and onto the bond sheet resulting in a heating of the coating on the front side of the bond sheet along the heating of the coating on the tissue sheet, and thereby producing an image or mark on both sheets. The image can be read from the front of both sheets in normal manner.

The composition of the heat-sensitive coating essentially consists of a thermochromic dye, a phenolic resin, a wax, a fatty acid, and a binding material of polyvinyl alcohol. The polyvinyl alcohol material is a water soluble synthetic resin and is used as a binder in the coating.

In view of the above discussion, the principal object of the present invention is to provide an improved thermal paper copy system.

Another object of the present invention is to provide a low-cost thermal original and a copy utilizing coated paper or like recording sheets.

An additional object of the present invention is to provide an improved thermochromic coating material on one surface of a record sheet and in contact with a mating record sheet having a coating thereon for enabling a direct thermal paper copy system.

A further object of the presemnt invention is to provide a tissue sheet and a bond sheet along with an improved thermochromic coating sandwiched therebetween and a coating on the tissue sheet, the coatings being reactive upon application of heat to provide direct imaging on both sheets.

Still another object of the present invention is to provide a thermochromic coating having polyvinyl alcohol as a binder ingredient thereof, and applied to the surfaces of the sheets of a two sheet copy system, which coatings are heated to record the image onto the sheets.

Still an additional object of the present invention is to provide means for laminating a tissue sheet and a bond sheet by use of a thermal reactive layer which acts as an adhesive for the two sheets.

Still a further object of the present invention is to provide a method for producing a two ply thermal recording medium by laminating one ply with a coated ply in a single operation wherein the coating is in a wet or moist condition to act as an adhesive between the two plies, and then top coating the lamination in a single continuous operation.

Additional advantages and features of the present invention will become apparent and fully understood from a reading of the following description taken together with the annexed drawing.

DESCRIPTION OF THE PREFERRED EMBODIMENT

Figure 1:
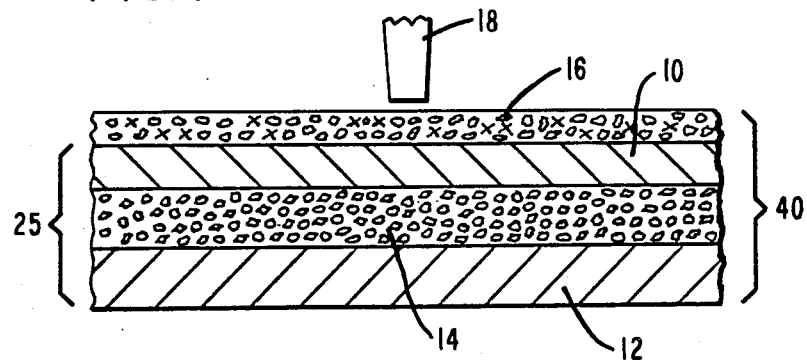
FIG. 1 is a diagrammatic view of the thermal copy system of the present invention.

FIG. 1 illustrates in diagrammatic form the concept of the present invention wherein a front or top tissue-type sheet 10 is collated with a back or bottom bond-type sheet 12. A thermoreactive coating 14 is provided on the sheet 12 and is sandwiched between the two sheets and the imaging technique is accomplished during heating of a thermoreactive coating 16 on the front surface of the sheet 10 and heating of the coating 14 on the front surface of the bond sheet 12.

The present invention provides for applying and using the thermoreactive coating 14 on the bond sheet 12 as an adhering agent for laminating the sheet 10 to the sheet 12.

Example I

Example I describes the materials for use with the method wherein the coating 14 of thermochromic material is applied to the front side of the bond sheet 12 and such sheet is mated or collated with the tissue sheet 10 so that the coating material 14 is sandwiched between the back surface of the tissue sheet 10 and the front surface of the bond sheet 12, as illustrated in FIG. 1. The two sheets 10 and 12 are then imaged by use of heat from a plurality of thermal elements such as 18, wherein the coating 14 and the coating 16 provide for a two ply record medium consisting of the sheets 10 and 12.

Coating Composition

The thermoreactive coating formulation 14 for the base sheet 12 essentially consists of a thermochromic dye, a phenolic resin, one or more waxes, and a binder. A preferred coating composition utilizing blue dye for blue print is as follows:

| Material | Base Coat Percent Dry Weight | Range |
|---|---|---|
| Dye (Blue) | 10.0% | 8-12% |
| PVA | 15.0 | 10-20 |
| Nopco NDW | 0.5 | 0-1 |
| Niaproof 08 | 0.5 | 0-1 |
| Bisphenol | 27.0 | 20-35 |
| Behenyl Alcohol | 13.2 | 10-15 |
| Ansilex Clay | 31.8 | 25-35 |
| Tinopal PT | 1.3 | 1-2 |

The coating below is coated onto sheet 10 on the second pass of the operation after lamination of the top ply or sheet 10 to the bottom ply or sheet 12. This coating provides the image for the top sheet 10.

| Material | Top Coat Percent Dry Weight | Range |
|---|---|---|
| Dye (Black) | 5.9% | 5-7% |
| Dye (Blue) | 0.1 | 0-0.2 |
| PVA | 15.0 | 10-20 |
| Nopco NDW | 0.5 | 0-1 |
| Niaproof 08 | 0.4 | 0-1 |
| Calgon | 0.4 | 0-1 |
| Bisphenol | 22.2 | 18-25 |
| Acrawax C | 12.0 | 10-15 |
| Armid HT | 5.0 | 4-6 |
| Ansilex Clay | 33.9 | 28-40 |
| Titanium Dioxide | 2.6 | 1-4 |
| Zinc Stearate | 2.0 | 1-3 |

Example II

Example II describes the materials for use with the method wherein the coating 14 of thermochromic material is applied to the front side of the bond sheet 12, using black dye.

Coating Composition

The thermoreactive coating formulation 14 for the base sheet 12 essentially consists of a thermochromic dye, a phenolic resin, one or more waxes, and a binder. A preferred coating composition utilizing black dye for black print is as follows:

| Material | Base Coat Percent Dry Weight | Range |
|---|---|---|
| Dye (Black) | 10.0% | 8-12% |
| PVA | 10.6 | 9-13 |
| Nopco NDW | 0.5 | 0-1 |
| Niaproof 08 | 0.5 | 0-1 |
| Bisphenol | 42.7 | 37-48 |
| P-Benzyl Biphenyl | 17.6 | 14-21 |
| Armoslip 18 | 8.8 | 7-10 |
| Ansilex Clay | 8.8 | 7-10 |
| Tinopal PT | 0.4 | 0-1 |

The formulation for the top coat 16 is the same as that recited in Example I above.

It is to be noted that while blue dye has been reasonably satisfactory in providing an acceptable imaging of the two ply thermal paper systems, the black dye provides better environmental stability (resistance to fading) and is considered to be the preferred composition.

Figure 2:
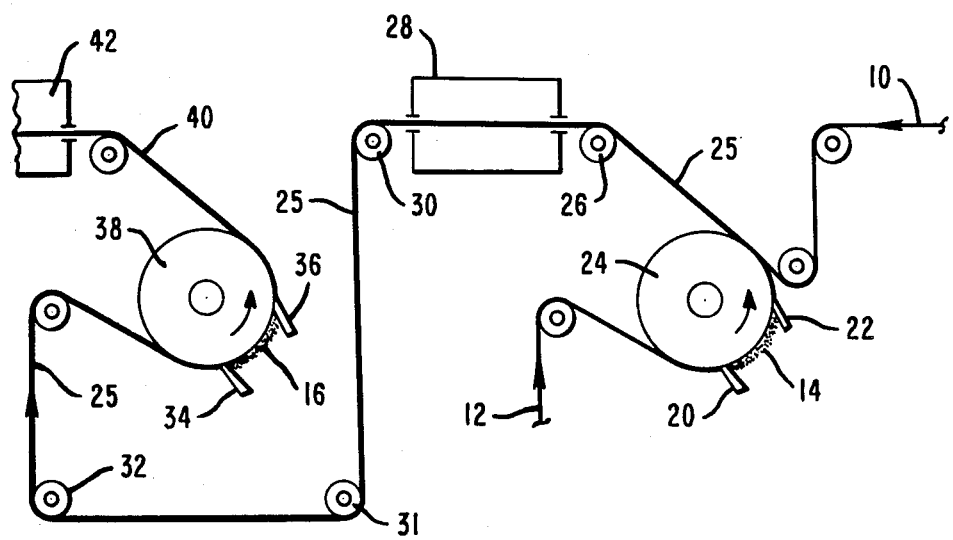
FIG. 2 is a diagrammatic view of the method of preparing the two ply thermal paper.

FIG. 2 illustrates the method by which the top sheet 10 is laminated with the base sheet 12 with the wet coating 14 therebetween. The top sheet 10 is collated with the base sheet 12 in a single operation, immediately following (0.1 to 0.5 seconds) application of the coating 14 by an applicator 20, and spreading of the coating 14 evenly by suitable means such as a doctor blade 22. The two sheets may then be rolled by means of a roller 24 to eliminate wrinkles and secure alignment of the two sheets together in a laminated manner. The wet or like thermally reactive coating 14 serves as an adhesive to laminate the two sheets 10 and 12 which in such condition are trained over a roller 26 and dried in a dryer 28.

The thermally reactive coating 14 is applied to the base sheet 12, and the overlay sheet 10 is applied to the base sheet 12 by the arrangement of FIG. 2, wherein the laminate is then dried and also may be calendered. The coating 14 is in the range of three to five pounds dry weight per ream on paper 12 and the coating 16 is in the range of one-half to two pounds dry weight per ream on paper 10. Calendering enhances the bond of the overlay sheet 10 to the support sheet 12 and increases the quality of the developed image. The process of coating by means of the applicator 20, as shown in FIG. 2, may include blade coater application, kiss roll, extrusion application, gravure, or air knife application.

The two ply thermal paper, indicated as 25 and consisting of the bond sheet 12, the coating 14 and the tissue sheet 10, after drying thereof, is directed around rollers 30, 31 and 32 to a station for coating the top sheet 10. The coating 16 is applied to the top ply 10 of the thermal paper 25 by an applicator 34 and is evenly spread by a doctor blade 36 as the paper 25 is trained around a roller 38 to complete the formation of the thermal paper 40. The paper 40 is then directed through a dryer 42 for drying the top coating 16, and then calendered.

The various ingredients utilized in the thermally reactive coating are further identified and are available from the noted sources. The polyvinyl alcohol (PVA) is available from Air Products Corporation; and the bisphenol (4,4-isopropylidenediphenol), as a reactive material of the phenol group, is available from Dow Chemical Company. The blue color forming dye is of the leuco group and is available from Hilton-Davis Company and the black color forming dye of the fluoran group is Pergascript from Ciba-Geigy Corporation or S205 from Yamada Chemical Company. The Behenyl Alcohol is a saturated fatty alcohol used as a temperature modifier and is availble from Fallack Chemical Company, the Acrawax C is a synthetic wax and is available from Glyco Inc., and the amide wax is Armid HT or Armoslip 18 from Armour Chemical Company. The filler may be calcium carbonate supplied by Georgia Marble Company, or the filler may be Ansilex clay supplied by Engelhard Corporation. Nopco NDW is a defoamer of the glycol group and is available from Diamond Shamrock Corp., Niaproof 08 is a sodium 2-ethylhexyl sulfate used as a wetting agent and is available from Niacet Corp. and Calgon is sodium hexametaphosphate from Calgon Corporation. Tinopal PT is a fluorescent brightener available from Ciba-Geigy Corporation. The P-Benzyl Biphenyl is a hydroxy cyclic compound used as a temperature modifier in a lower temperature range than the Behenyl Alcohol and is available from Nagase America Corporation. The titanium dioxide is a white pigment available from N. L. Industries (National Lead Corporation), and the zinc stearate is used as an anti-stick agent and is available from Witco Chemical Company.

It is thus seen that herein shown and described is a multiple copy record system that utilizes an improved temperature-sensitive coating on one surface of a base sheet and an improved temperature-sensitive coating on a top sheet. The one coating is sandwiched between the one surface of the base sheet and a surface of the top sheet and applied heat to the coatings causes imaging on the top sheet and the base sheet. The polyvinyl alcohol binder in the coating provides a low cost and tackified formulation for the coatings in producing a two copy system. The process of wet lamination provides for maintaining contact of the two sheets during the printing operation, and permitting ease of separation of the sheets after printing. The present invention enables the accomplishment of the objects and advantages mentioned above, and while a preferred embodiment and a modification of the invention have been disclosed herein, other variations thereof may occur to those skilled in the art. It is contemplated that all such variations and modifications not departing from the spirit and scope of the invention hereof are to be construed in accordance with the following claims.

We claim:
1. A method of forming a two ply thermal paper comprising the steps of:
providing a base sheet of bond paper;
coating the base sheet with a thermoreactive layer essentially consisting of a thermochromic color forming dye of about 8 to 12%, a temperature modifying, saturated fatty alcohol of about 10 to 15%, a bisphenol of about 20 to 35%, a fluorescent brightener of about 1 to 2%, a filler of about 25 to 35%, and a binder of polyvinyl alcohol applied on one surface of the base sheet,
laminating a top sheet of tissue-type paper to the base sheet within a fraction of a second of time while the thermoreactive layer is in a wet condition for adhering the two sheets,
drying the laminated sheets,
coating the top sheet with a thermoreactive layer essentially consisting of a thermochromic color forming dye of about 5 to 7%, a synthetic wax of about 10 to 15%, a bisphenol of about 18 to 25%, an amide wax of about 4 to 6%, a white pigment of about 1 to 4%, an anti-stick agent of about 1 to 3%, a filler of about 28 to 40%, and a binder of polyvinyl alcohol applied on one surface of the top sheet, and
drying the coating on the top sheet.
2. The method of claim 1 wherein the color forming dye in the base coat is blue selected from the leuco group.
3. The method of claim 1 wherein the color forming dye in the base coat is black selected from the fluoran group.
4. A method of forming a heat sensitive copy system for use with thermal printing means comprising the steps of:
providing a first sheet of bond paper,
coating the first sheet with a thermoreactive layer essentially consisting of a thermochromic color forming dye of about 8 to 12%, a bisphenol of about 37 to 48%, a temperature modifying hydroxy cyclic compound of about 14 to 21%, an amide wax of about 7 to 10%, a fluorescent brightener of about 1%, a filler of about 7 to 10%, and a binder of polyvinyl alcohol applied on one surface of the first sheet,
laminating a second sheet of tissue-type paper to the first sheet within a fraction of a second of time while the thermoreactive layer is in a wet condition for adhering the two sheets,
drying the laminated sheets, coating the second sheet with a layer essentially consisting of a thrmochromic color forming dye of about 5 to 7%, a bisphenol of about 18 to 25%, a synthetic wax of about 10 to 15%, an amide wax of about 4 to 6%, a white pigment of about 1 to 4%, an anti-stick agent of about 1 to 3%, a filler of about 28 to 40%, and a binder of polyvinyl alcohol applied on one surface of the second sheet, and drying the coating on the second sheet.

5. The method of claim 1 wherein the fraction of a second of time is in the range of 0.1 to 0.5 second.

6. The method of claim 4 wherein the fraction of a second of time is in the range of 0.1 to 0.5 second.

* * * * *